United States Patent [19]

Green

[11] 4,270,355

[45] Jun. 2, 1981

[54] MASTER CYLINDER AND ACTUATOR ASSEMBLIES

[75] Inventor: Martin Green, Birmingham, England

[73] Assignee: Girling Midland Ross Air Actuation Limited, Birmingham, England

[21] Appl. No.: 926,493

[22] Filed: Jul. 20, 1978

[30] Foreign Application Priority Data

Jul. 20, 1977 [GB] United Kingdom ............... 30541/77

[51] Int. Cl.³ ............................................. F15B 15/18
[52] U.S. Cl. ..................................... 60/593; 60/589; 92/13.8; 92/129
[58] Field of Search ................ 60/593, 558, 559, 589, 60/547 R, 548; 92/13.8, 129

[56] References Cited

U.S. PATENT DOCUMENTS

| 2,908,137 | 10/1959 | Spalding | 60/548 |
|---|---|---|---|
| 3,127,966 | 4/1964 | Sheriff | 60/547 R |
| 3,175,473 | 3/1965 | Boteles | 92/13.8 |
| 3,638,427 | 2/1972 | Meyers | 60/548 |
| 3,678,687 | 7/1972 | Watabe | 60/593 |
| 4,096,696 | 6/1978 | Van House | 60/547 |

FOREIGN PATENT DOCUMENTS 456297 11/1936 United Kingdom ................... 92/13.8

*Primary Examiner*—Abraham Hershkovitz
*Attorney, Agent, or Firm*—Scrivener Clarke Scrivener and Johnson

[57] ABSTRACT

The invention relates to master cylinder and actuator assemblies in which a push rod connected to the actuator extends forwardly through a vehicle mounting member and is engageable at its forward end with a piston, there normally being a clearance between the push rod and the piston in their inoperative positions. Such assemblies suffer from the disadvantage that a desired working clearance is difficult to attain due to manufacturing tolerances. Embodiments of the present invention overcome that disadvantage and provide an assembly which includes a lateral projection (10) on the push rod (5), which projection limits rearward movement of the push rod relative to the mounting member (3).

8 Claims, 6 Drawing Figures

MASTER CYLINDER AND ACTUATOR ASSEMBLIES

This invention relates to master cylinder and actuator assemblies.

Such assemblies are known which comprise a master cylinder and a pressure operated actuator, which is usually air operated, both connected to a mounting member of a vehicle on opposite sides thereof, the actuator being rearwardly of the master cylinder. A piston works in the cylinder and is abutted at its rear end by a push rod which passes through the mounting member and which is coupled at its rear end to a diaphragm of the actuator, the diaphragm being movable in response to air pressure to move the push rod and the piston.

Usually a small working clearance between the push rod and the piston in their inoperative positions is necessary.

One disadvantage of the known assemblies is that the desired working clearance between the push rod and the piston is difficult to attain because of the manufacturing tolerances in the master cylinder the actuator and the mounting member.

In accordance with one aspect of the present invention, there is provided a master cylinder and actuator assembly in which a push rod is engageable at its forward end with a piston working in the master cylinder, the push rod being arranged to pass through a vehicle mounting member located in use between the piston and the actuator, and including means for limiting rearward movement of the push rod relative to the mounting member.

Preferably, the push rod has a lateral projection which is engageable with the mounting member, or an abutment secured thereto, to limit rearward movement of the push rod.

It is thereby ensured that, in the inoperative condition of the assembly, a predetermined minimum length of push rod extends forwardly of the mounting member, and that the relative inoperative position of the piston and push rod is independent of tolerances in the mounting member and the actuator.

Another disadvantage of the known assemblies is that push rods of difference lengths have to be made for use with vehicles having different thicknesses of chassis member.

In accordance with another aspect of the invention, there is provided a master cylinder and actuator assembly comprising a push rod for transferring actuating forces from the actuator to a piston working in the cylinder and passing in use through a chassis member of a vehicle, wherein the length of the push rod is adjustable.

Preferably, the push rod is formed in two parts screwed threadedly connected to each other. The parts may be crimped or otherwise locked together to provide a push rod of predetermined overall length.

A known form of master cylinder and actuator assembly and some forms of assembly in accordance with the invention will now be described, by way of example, with reference to the accompanying drawings, in which.

Figure 1:
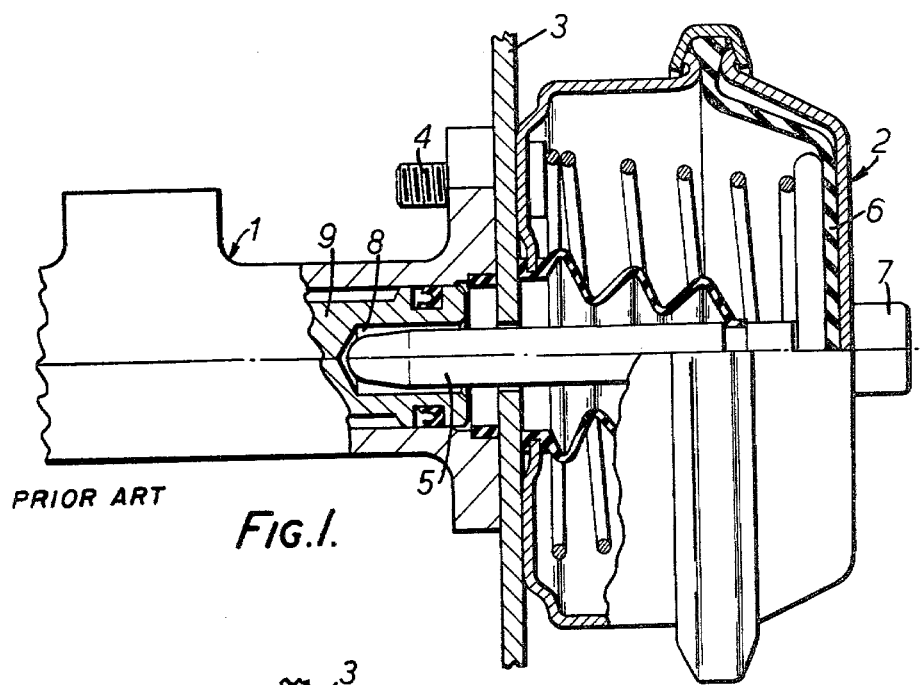
FIG. 1 is a part sectional elevational view of the known form of assembly.

The known assembly illustrated in FIG. 1 comprises the master cylinder 1 and the actuator 2 secured to a vehicle mounting member 3, on opposite sides thereof, by bolts 4, only one of which is shown. A push rod 5 is movable in response to movement of the diaphragm 6 when pressurised air is introduced through an inlet 7. The push rod 5 extends forwardly through an aperture in chassis member 3 and is received in a recess 8 in the rear end of a piston 9 working in the cylinder.

In the illustrated inoperative condition of the assembly, the piston 9 and push rod 5 are in their rearmost positions and desirably have between them a small working clearance, as illustrated. However, it is difficult in practice to attain accurately the working clearance because of the tolerances on the components parts. As an example, the total tolerance on the master cylinder 1 may be 0.127 cms, on the actuator 2 may be 0.381 cm and on the thickness of the mounting member 3 may be 0.061 cms. Thus, the possible total tolerance on the working clearance may be as much as 0.569 cms.

FIGS. 2 to 6 show arrangements for reducing the tolerance on the working clearance.

In the following description parts corresponding to those of FIG. 1 have been given corresponding reference numerals.

Each of FIGS. 3 to 6 illustrates the region of the rear of the master cylinder 1 and piston 9, and the forward end of the push rod 5.

In each form of assembly illustrated in FIGS. 2 to 6, the push rod 5 has a lateral projection, which may take various forms, which is engageable with the mounting member 3 to limit rearward movement of the push rod.

Figure 2:
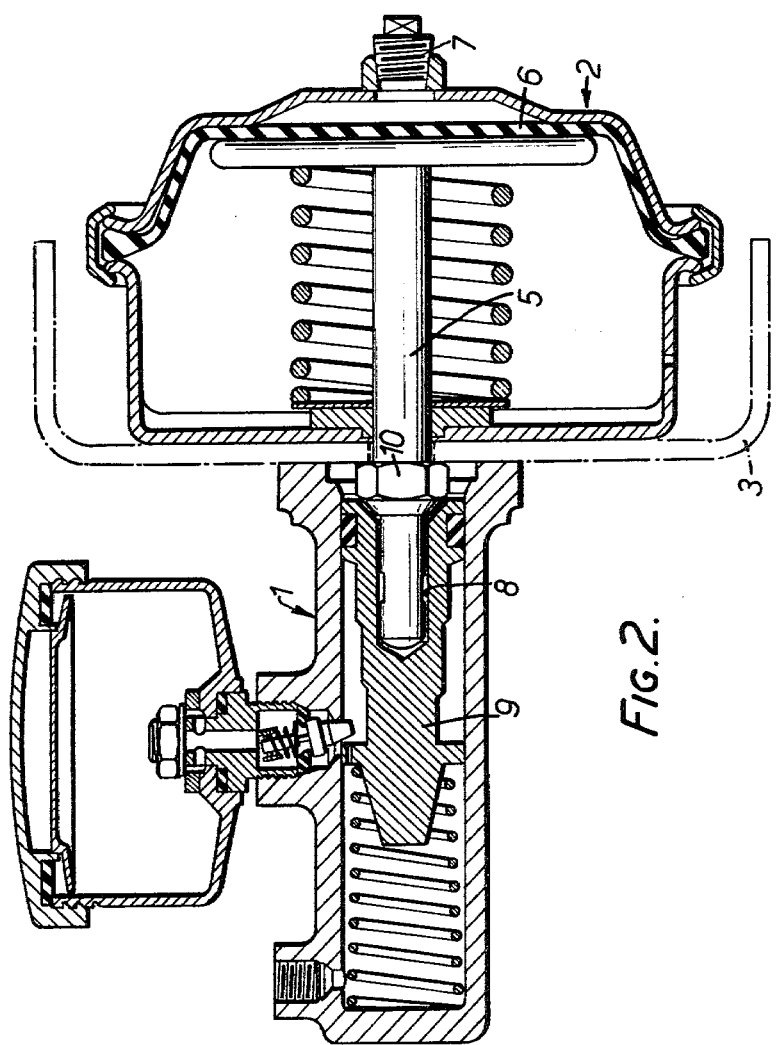
FIG. 2 is an axial cross-section of one form of assembly according to the invention.

The projection of FIG. 2 is in the form of a nut 10 screwed on to a screw-threaded end of the push rod 5. In the illustrated inoperative position the nut 10 engages the mounting member 3.

Figure 3:
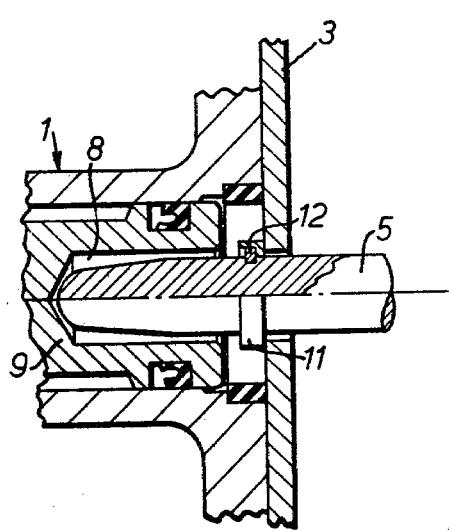
FIGS. 3 to 6, are detail sectional views of different forms of assembly in accordance with the invention.

In FIG. 3, the projection is in the form of a cup-shaped washer 11 which co-operates with a spring clip 12 located in an annular groove in the push rod. The washer 11 is located between the spring clip 12 and the chassis member 3 and is engageable with the latter. If the radial depth of the spring clip is large enough, the washer could be dispensed with, the spring clip then being engageable itself with the mounting member 3.

Figure 4:
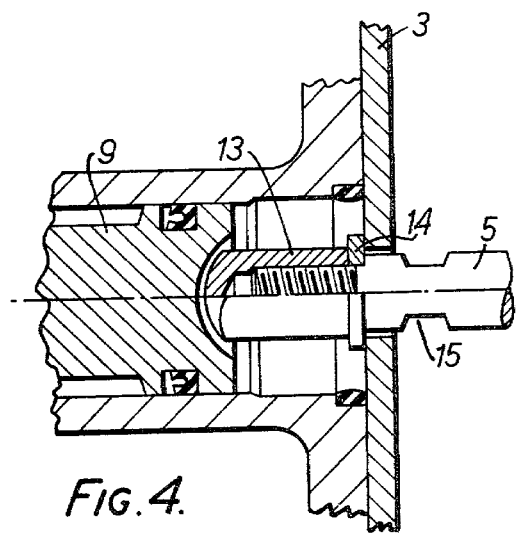

The forward end of the push rod 5 of FIG. 4 is recessed and screw-threaded to receive a complementary threaded end cap 13 which clamps a washer 14 against a shoulder at the rear end of the recess. The washer 14 is engageable with the chassis member 3. The washer 14 is located in situ and flats 15 are provided on the push rod 5 to enable the rod to be held and allow the cap 13 to be screwed in place.

Figure 5:
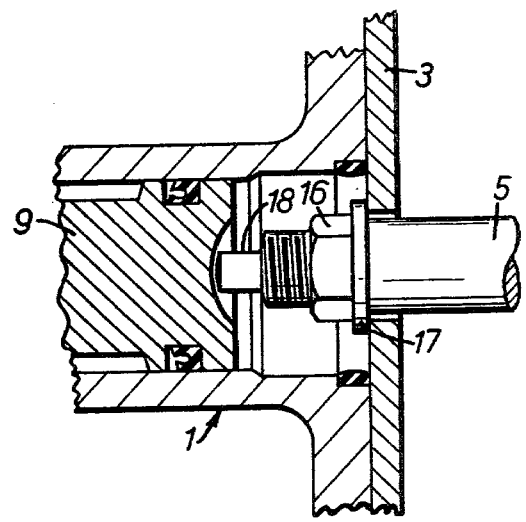

In FIG. 5, the end of the push rod 5 is screw-threaded to receive a nut 16 and washer 17 which is located against a shoulder on the push rod, the washer 17 being engageable with the mounting member 3. Flats 18 are provided on the push rod to resist the tightening torque of the nut 16.

Figure 6:
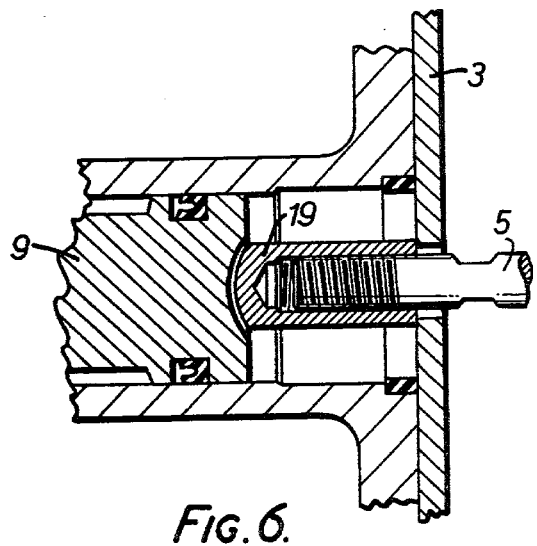

FIG. 6 illustrates an assembly in which the push rod 5 is screw threaded at its end to receive a cap 19 which can be crimped in a desired position and which is engageable with the mounting member 3.

In each of the forms of assembly shown in FIGS. 2 to 6, the tolerances of the actuator 2 and the chassis member 3 do not affect the working clearance between the push rod 5 and the piston 9, and the desired clearance is thus easier to attain than with the above-described known form of assembly.

In the forms of assembly illustrated in FIGS. 2 and 6, the nut 10 or cap 19 may be adjusted before assembly so that the length of the push rod can be chosen to suit any particular thickness of mounting member 3 which may occur in different vehicle models.

It will be appreciated that many modifications are possible within the scope of the invention. For example, means for limiting rearward movement of the push rod other than the projections illustrated in FIGS. 2 to 6 would be used.

I claim:

1. A master cylinder and actuator assembly for a vehicle comprising mounting means interposed between adjacent ends of said cylinder and said actuator assembly for mounting said master cylinder and actuator in operative relationship with respect to each other, a push rod extending from the actuator through the mounting means and being moveable between retracted and extended position, said push rod being engageable with a piston working in the master cylinder when moved towards its extended position, and stop means comprising a lateral projection on the push rod which is engageable with the mounting means for limiting the retracted movement of said push rod relative to the mounting means, said stop means being so located on said push rod relative to said mounting means that when the piston of the master cylinder is in its inoperative position and said push rod is in its retracted position, there is a clearance between the piston and the adjacent end of the push rod.

2. An assembly according to claim 1 wherein said mounting means comprises a mounting member of the vehicle located in use between said piston and said actuator, and said stop means is engagable with said mounting member on the same side thereof as said piston.

3. An assembly according to claim 1, wherein said projection is provided by a stop member secured to the push rod.

4. An assembly according to claim 3, wherein said stop member is a screw-threaded member screwed on to a complementary screw threaded portion of the push rod.

5. An assembly according to claims 3 or 4, wherein the stop member is adjustable on the push rod to vary the length of push rod protruding through the mounting member towards the master piston.

6. An assembly according to claim 3, wherein the stop member is a washer.

7. An assembly according to claim 6, wherein the washer is located on the push rod by a spring clip.

8. An assembly according to claim 6, wherein the washer is located on the push rod by a screw-threaded member screwed on to a complementary screw-threaded portion of the push rod.

* * * * *